(12) United States Patent
Bian et al.

(10) Patent No.: US 10,585,245 B1
(45) Date of Patent: Mar. 10, 2020

(54) MULTIPLE-LAYER ARRANGEMENTS USING TUNABLE MATERIALS TO PROVIDE SWITCHABLE OPTICAL COMPONENTS

(71) Applicant: GLOBALFOUNDRIES Inc., Grand Cayman (KY)

(72) Inventors: Yusheng Bian, Ballston Lake, NY (US); Abu Thomas, Brookline, MA (US); Ajey Poovannummoottil Jacob, Watervliet, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/199,727

(22) Filed: Nov. 26, 2018

(51) Int. Cl.
*G02B 6/293* (2006.01)
*G02F 1/225* (2006.01)
*H01Q 3/26* (2006.01)
*G02F 1/065* (2006.01)

(52) U.S. Cl.
CPC ..... *G02B 6/29346* (2013.01); *G02B 6/29334* (2013.01); *G02F 1/065* (2013.01); *G02F 1/2252* (2013.01); *H01Q 3/2676* (2013.01)

(58) Field of Classification Search
CPC . G02B 6/29346; G02B 6/29334; G02F 1/065; G02F 1/2252; H01Q 3/2676
See application file for complete search history.

(56) References Cited

U.S. PATENT DOCUMENTS

| | | | |
|---|---|---|---|
| 4,006,963 A | 2/1977 | Baues et al. | |
| 5,412,743 A * | 5/1995 | Brazas, Jr. | G02B 6/34 385/10 |
| 5,625,729 A * | 4/1997 | Brown | G02B 6/34 359/573 |
| 6,072,925 A * | 6/2000 | Sakata | G02B 6/124 372/50.1 |
| 6,236,774 B1 * | 5/2001 | Lackritz | G02B 6/1221 385/10 |
| 6,353,690 B1 * | 3/2002 | Kulishov | G02F 1/292 385/10 |
| 6,356,674 B1 | 3/2002 | Davis et al. | |
| 6,821,457 B1 | 11/2004 | Natarajan et al. | |
| 6,842,545 B2 * | 1/2005 | Lackritz | G02B 6/1221 385/10 |
| 7,233,710 B2 * | 6/2007 | Wang | A61B 1/00096 385/10 |
| 9,548,589 B2 * | 1/2017 | Chen | H01S 5/2054 |

(Continued)

OTHER PUBLICATIONS

Zhang et al., "Efficient silicon nitride grating coupler with distributed Bragg reflectors", Sep. 8, 2014 | vol. 22, No. 18 | Optics Express.

(Continued)

*Primary Examiner* — Andrew Jordan
(74) *Attorney, Agent, or Firm* — Thompson Hine LLP (57) ABSTRACT

Structures that include an optical component, such as a grating coupler, and methods of fabricating a structure that includes an optical component, such as a grating coupler. First and second layers are arranged over the optical component with the first layer arranged between the second layer and the optical component. The first and second layers are each composed of a tunable material having a refractive index that is a function of a bias voltage applied to the first layer and the second layer.

20 Claims, 6 Drawing Sheets

(56) References Cited

U.S. PATENT DOCUMENTS

| | | | | |
|---|---|---|---|---|
| 9,632,317 | B2* | 4/2017 | Martinez | G02B 5/18 |
| 9,651,718 | B2* | 5/2017 | Chen | G02B 3/08 |
| 10,185,092 | B1* | 1/2019 | Bian | G02B 6/305 |
| 10,386,581 | B2* | 8/2019 | Chen | G02B 6/29328 |
| 2003/0048975 | A1* | 3/2003 | Lackritz | G02B 6/1221 |
| | | | | 385/14 |
| 2005/0238277 | A1* | 10/2005 | Wang | A61B 1/00096 |
| | | | | 385/8 |
| 2015/0249321 | A1* | 9/2015 | Chen | H01S 5/2054 |
| | | | | 372/45.01 |
| 2015/0355410 | A1* | 12/2015 | Park | G02F 1/0147 |
| | | | | 385/37 |
| 2015/0370073 | A1* | 12/2015 | Martinez | G02B 5/18 |
| | | | | 359/630 |
| 2016/0315452 | A1* | 10/2016 | Chen | G02B 6/29328 |
| 2017/0227685 | A1* | 8/2017 | Chen | G02B 3/08 |
| 2019/0171031 | A1* | 6/2019 | Popovich | G02B 5/0252 |

OTHER PUBLICATIONS

Kim et al., "Tunable Grating Couplers for Broadband Operation Using Thermo-Optic Effect in Silicon", IEEE Photonics Technology Letters, vol. 27, No. 21, Nov. 1, 2015.

Hong et al., "Efficient Silicon Nitride Grating Coupler with a Dielectric Multilayer Reflector", © 2017 The Japan Society of Applied Physics, 22nd Microoptics Conference, Tokyo, Japan, Nov. 19-22, 2017.

* cited by examiner

MULTIPLE-LAYER ARRANGEMENTS USING TUNABLE MATERIALS TO PROVIDE SWITCHABLE OPTICAL COMPONENTS

BACKGROUND

The present invention relates to photonics chips and, more specifically, to structures that include an optical component, such as a grating coupler, and methods of fabricating a structure that includes an optical component, such as a grating coupler.

Photonics chips are used in many applications and systems including, but not limited to, data communication systems and data computation systems. A photonics chip integrates optical components, such as waveguides and bends, and electronic components, such as field-effect transistors, into a unified platform. Among other factors, layout area, cost, and operational overhead may be reduced by the integration of both types of components.

Grating couplers furnish the optical components commonly used as optical antennas in optical phased-array applications. Conventionally, the optical antennas in an optical phased-array are switched using Mach-Zehnder interferometer (MZI) modulators. A disadvantage of this type of switching is that MZI modulators exhibit a weak electro-optic effect and, for that reason, have a large form factor that results in a large footprint.

Improved structures that include an optical component, such as a grating coupler, and methods of fabricating a structure that includes an optical component, such as a grating coupler, are needed.

SUMMARY

In an embodiment of the invention, a structure includes an optical component and first and second layers that are arranged over the optical component with the first layer arranged between the second layer and the optical component. The first and second layers are each composed of a tunable material having a refractive index that is a function of a voltage applied to the first and second layers.

In an embodiment of the invention, a method includes forming an optical component, forming a first layer over the optical component, and forming a second layer over the first layer. The first and second layers are each composed of a tunable material having a refractive index that is a function of a bias voltage applied to the first layer and the second layer.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
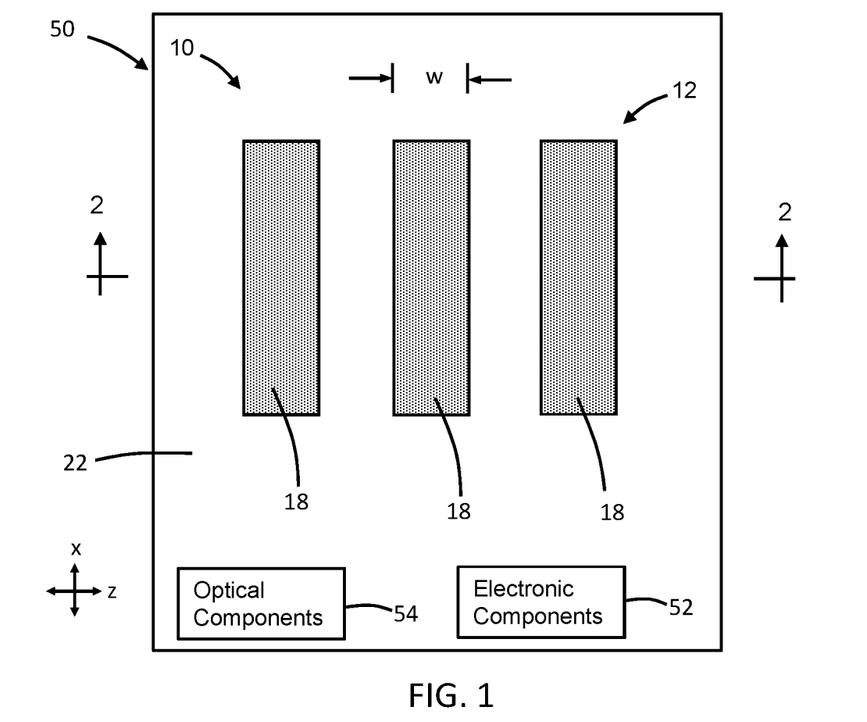
FIG. 1 is a top view of a photonics chip including a structure at an initial fabrication stage of a processing method in accordance with embodiments of the invention.
Figure 2:
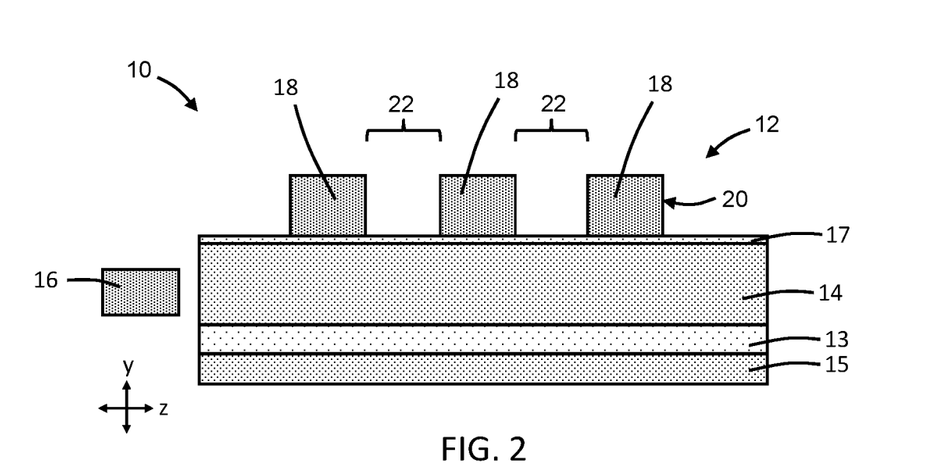
FIG. 2 is a cross-sectional view of the structure taken generally along line 2-2 in FIG.

With reference to FIGS. 1, 2 and in accordance with embodiments of the invention, a structure 10 includes a grating coupler 12 arranged over a semiconductor layer 14 and a waveguide 16 that is coupled with the grating coupler 12. A dielectric layer 17 composed of a dielectric material, such as silicon dioxide, may be arranged between the grating coupler 12 and the semiconductor layer 14. The semiconductor layer 14 may be composed of a single-crystal semiconductor material, such as single-crystal silicon from a device layer of a silicon-on-insulator (SOI) wafer. The silicon-on-insulator (SOI) wafer further includes a buried insulator layer 13 composed of a dielectric material, such as silicon dioxide, and a substrate 15 composed of a single-crystal semiconductor material, such as single-crystal silicon. The waveguide 16 provides optical signals to the grating coupler 12.

The grating coupler 12 includes an arrangement of grating structures 18 defined in a layer, generally indicated by reference numeral 20, by a series of notches or grooves 22. The grooves 22 may be patterned in the layer 20 by lithography and etching processes. In the representative embodiment, the grooves 22 are extended fully through the layer 20 by the etching process such that the grating structures 18 are fully disconnected from each other. The grooves 22 provide trenches that define respective spaces or gaps that are arranged between adjacent pairs of the grating structures 18. In an embodiment, the grating structures 18 may be arranged as a group of spaced-apart parallel lines having given dimensions (e.g., width, w, and length), and the grooves 22 may be linear. In an alternative embodiment, the grating structures 18 may be arranged as a group of concentric arc-shaped that are nested together and in which the grating structures 18 have given dimensions (e.g., width, w, and arc length), and the grooves 22 may be arc-shaped.

The grating structures 18 and grooves 22 may have a given periodicity defined by a pitch and a filling factor or duty cycle relating to their dimensions. The pitch represents a distance in a horizontal direction between adjacent pairs of the grating structures 18, and the duty cycle represents a fraction of the area of the grating coupler 12 that is occupied by the grating structures 18. In an alternative embodiment, the grating structures 18 of the grating coupler 12 may be apodized (i.e., aperiodic) with a pitch that varies as a function of position (i.e., location along the z-axis).

The lithography and etching processes forming the grooves 22 in the layer 20 may include applying an etch mask formed by a lithography process over the deposited layer 20 and etching the masked layer 20 with an etching process, such as reactive ion etching (ME). The etching process may be selected to stop on the material of the dielectric layer 17 after penetrating fully through the layer 20. In an embodiment, the grating structures 18 may be composed of a polycrystalline semiconductor material, such as polysilicon, that is deposited by chemical vapor deposition and patterned.

Figure 2A:
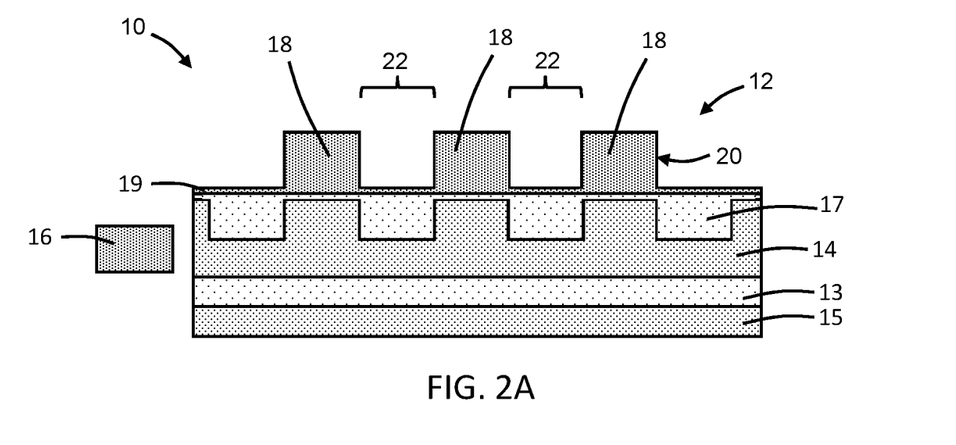
FIG. 2A is a cross-sectional view of a structure in accordance with alternative embodiments of the invention.

In an alternative embodiment and as shown in FIG. 2A, the etching process may only extend the grooves 22 partially through the layer 20 such that the grating structures 18 are connected by a thin web 19 of the layer 20 that is located within the grooves 22 over the dielectric layer 17. In an alternative embodiment and as also shown in FIG. 2A, the semiconductor layer 14 may be patterned to form grooves that match the pitch and duty cycle of the grating structures 18 and grooves 22 and that are filled by the dielectric material of the dielectric layer 17.

In the representative embodiment, the grating structures 18 are depicted as rectangular shapes having vertical sidewalls. However, in alternative embodiments, the grating structures 18 may be trapezoidal with sidewalls tapering from top to bottom, trapezoidal with sidewalls having inverse tapering (i.e., flaring) from top to bottom, or non-rectangular (e.g., rounded sidewalls).

Figure 3:
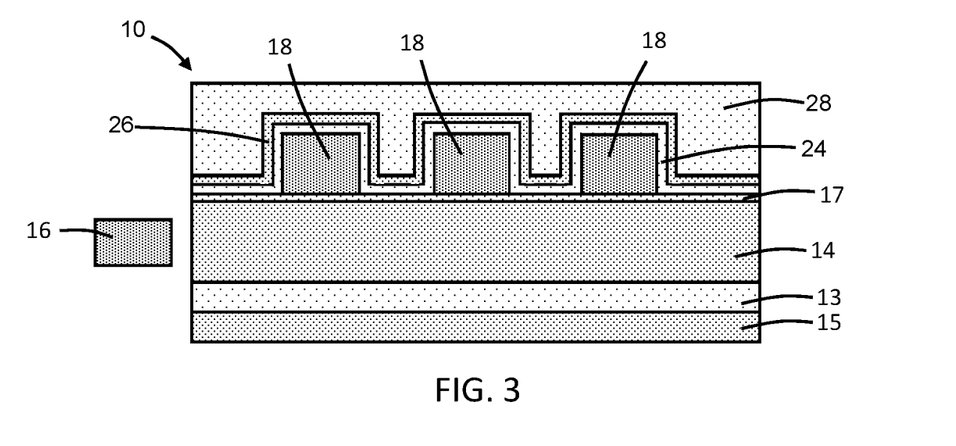
FIG. 3 is a cross-sectional view of the structure at a fabrication stage subsequent to FIG. 2.

With reference to FIG. 3 in which like reference numerals refer to like features in FIG. 2 and at a subsequent fabrication stage, conformal dielectric layers 24, 26 composed of respective dielectric materials are sequentially formed by, for example, atomic layer deposition over the grating structures 18. The conformal dielectric layer 24 may be composed of an oxide of silicon (e.g., silicon dioxide), and the conformal dielectric layer 26 may be composed of silicon nitride. The grating structures 18 are encapsulated or encased inside of the conformal dielectric layer 24 and the dielectric layer 17 with the conformal dielectric layer 26 providing an overlay extending across the encapsulated grating structures 18.

A dielectric layer 28 is formed over the grating coupler 12 and the dielectric layers 24, 26. The dielectric layer 28 may have a thickness that is greater than the height of the grating structures 18 such that the grating coupler 12 is buried in the dielectric material of the dielectric layer 28. The dielectric layer 28 may be composed of a dielectric material, such as an oxide of silicon, deposited by chemical vapor deposition and planarized with, for example, chemical mechanical polishing (CMP). For example, the dielectric layer 28 may be composed of silicon dioxide deposited by chemical vapor deposition using ozone and tetraethylorthosilicate (TEOS) as reactants.

Figure 4:
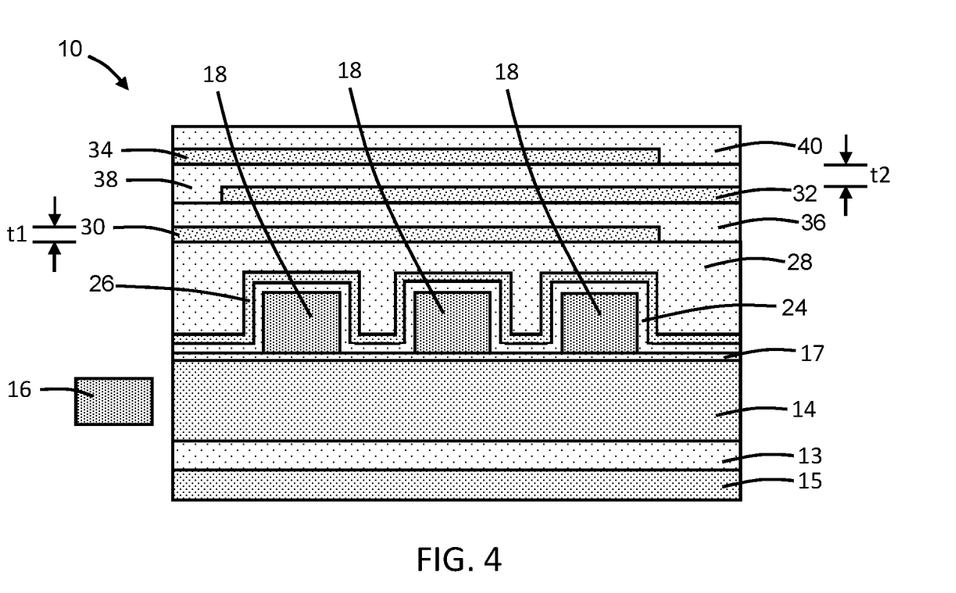
FIG. 4 is a cross-sectional view of the structure at a fabrication stage subsequent to FIG. 3.

With reference to FIG. 4 in which like reference numerals refer to like features in FIG. 3 and at a subsequent fabrication stage, a tunable material layer 30 is formed over the dielectric layer 28, and a dielectric layer 36 is formed over the tunable material layer 30. A tunable material layer 32 is formed over the dielectric layer 36, and a dielectric layer 38 is formed over the tunable material layer 32. A tunable material layer 34 is formed over the dielectric layer 38, and a dielectric layer 40 is formed over the tunable material layer 34. The tunable material layers 30, 32, 34 and the dielectric layers 36, 38, 40 define a layer stack that is arranged over the grating coupler 12. The tunable material layers 30 and 34 may be laterally offset relative to the tunable material layer 32, and the tunable material layer 32 may be laterally offset relative to the tunable material layers 30 and 34, which may be accomplished by patterning each of the tunable material layers 30, 32, 34 with lithography and etching processes following its deposition. The layer stack may be enlarged by adding additional pairs of the tunable material layers 30, 32, 34 and the dielectric layers 36, 38, 40. The tunable material layers 30, 32, 34 may be planar with flat top and bottoms surfaces, and the tunable material layers 30, 32, 34 may be respectively formed on planar surfaces of the dielectric layer 28 and the dielectric layers 36, 38.

The dielectric layers 36, 38, 40 may be composed of a dielectric material, such as an oxide of silicon (e.g., silicon dioxide), deposited by atomic layer deposition or chemical vapor deposition, and optionally planarized by chemical-mechanical polishing following deposition. The tunable material layers 30, 32, 34 may be composed of a tunable material deposited by atomic layer deposition or chemical vapor deposition. In an embodiment, the tunable material layers 30, 32, 34 may be composed of a conductor that is a tunable material based on an applied bias voltage. In an embodiment, the tunable material layers 30, 32, 34 may be composed of indium-tin oxide (ITO). In an embodiment, the tunable material layers 30, 32, 34 may be composed of other types of inorganic tunable materials, such as vanadium oxide and germanium-antimony telluride, or a combination of one or both of these materials with indium-tin oxide. In an embodiment, the tunable material layers 30, 32, 34 may be composed of an electro-optic polymer or a liquid crystal.

The ability to tune the tunable material of the arises from material properties of the tunable material layers 30, 32, 34 that provide a permittivity (i.e., dielectric constant) that can be varied by an applied bias voltage. The refractive index of the tunable material layers 30, 32, 34 is related to the permittivity and, for that reason, the refractive index of the tunable material layers 30, 32, 34 is also a function of a bias voltage applied to the tunable material layers 30, 32, 34. The refractive index of the tunable material layers 30, 32, 34 can be varied with the applied bias voltage to effectively switch the grating coupler 12 between different states for transmitting optical signals at a given wavelength. In one state (e.g., no applied bias voltage), the tunable material layers 30, 32, 34 may have a high refractive index and exhibit low optical signal absorption such that the transmission of optical signals at the given wavelength through and coupling out of the grating coupler 12 is unaffected. In another state (e.g., an applied negative bias voltage), the tunable material layers 30, 32, 34 may have a low refractive index and exhibit high optical signal absorption such that the transmission of optical signals at the given wavelength through the grating coupler 12 and coupling out of the grating coupler 12 is reduced or even blocked.

The tunable material layers 30, 32, 34 may have a uniform thickness, t1, and the thickness, t2, of the dielectric layers 36, 38, 40 in the spaces between the tunable material layers 30, 32, 34 may also have a uniform thickness. The tunable material layers 30, 32, 34 may have a given periodicity defined by a pitch and a filling factor or duty cycle relating to their thickness and the thicknesses of the dielectric layers 36, 38, 40. The pitch represents a distance in a vertical direction between adjacent pairs of the tunable material layers 30, 32, 34, and the duty cycle represents a fraction of the volume that is occupied by the tunable material layers 30, 32, 34 in comparison to the total volume of the tunable material layers 30, 32, 34 and dielectric layers 36, 38, 40.

Figure 4A:
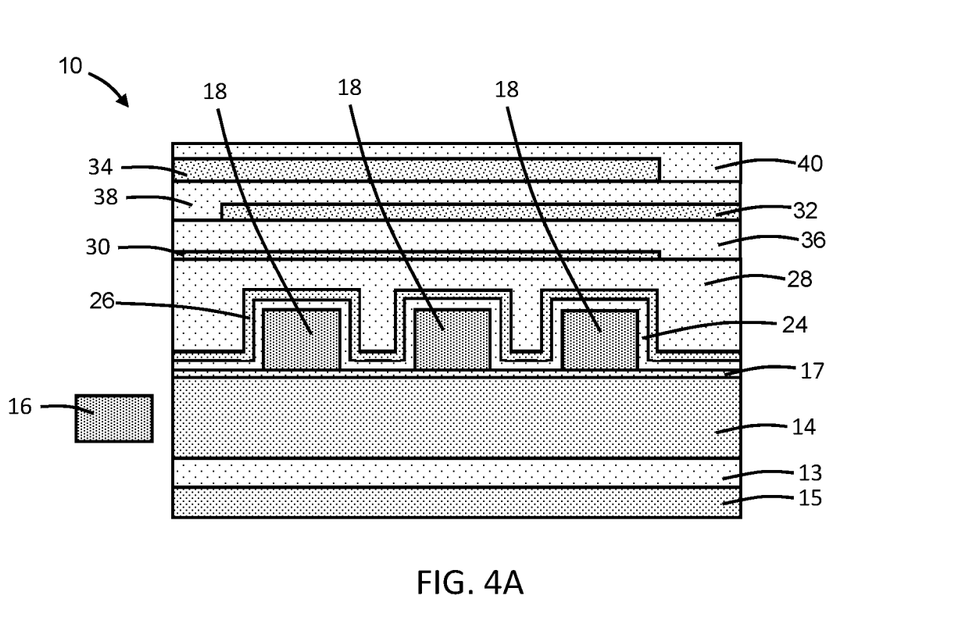
FIG. 4A is a cross-sectional view of a structure in accordance with alternative embodiments of the invention.

In an embodiment, the tunable material layers 30, 32, 34 may have a periodic pitch as shown in FIG. 4. In an alternative embodiment and as shown in FIG. 4A, the tunable material layers 30, 32, 34 may be apodized (i.e., aperiodic) with a pitch that varies as a function of position (i.e., location along the y-axis). The apodized pitch may be established, for example, by varying the thickness, t1, of the tunable material layers 30, 32, 34. For example, the tunable material layer 30 closest to the grating coupler 12 may be thinner than the tunable material layer 32, and the tunable material layer 32 may be thinner than the tunable material layer 34 that is most remote from the grating coupler 12. Alternatively, the thickness, t1, of the tunable material layers 30, 32, 34 may be held constant and only the thickness, t2, of the dielectric layers 36, 38, 40 may be varied to provide the apodized pitch. Alternatively, the thickness, t2, of the dielectric layers 36, 38, 40 and the thickness, t1, of the tunable material layers 30, 32, 34 may be varied to provide the apodized pitch.

Figure 5:
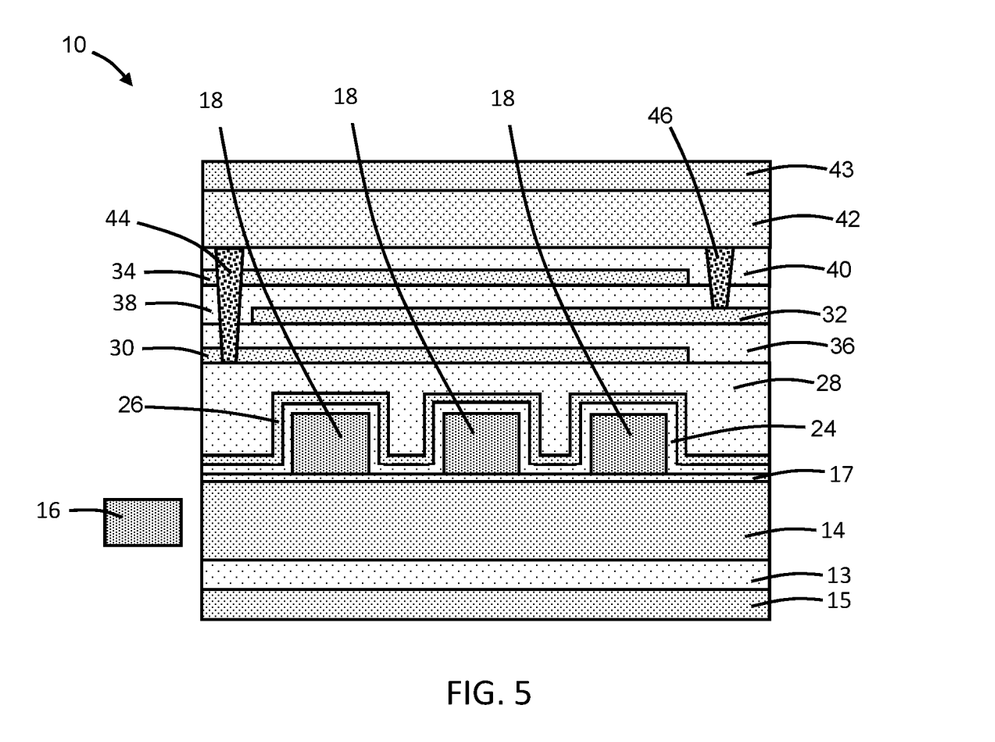
FIG. 5 is a cross-sectional view of the structure at a fabrication stage subsequent to FIG. 4.

With reference to FIG. 5 in which like reference numerals refer to like features in FIG. 4 and at a subsequent fabrication stage, a multilayer back-end-of-line stack, generally indicated by reference numeral 42, is formed by back-end-of-line (BEOL) processing over the dielectric layer 40. The back-end-of-line stack 42 may include one or more interlayer dielectric layers composed of one or more dielectric materials, such as a carbon-doped silicon oxide, and metallization composed of, for example, copper, tungsten, and/or cobalt that is arranged in the one or more interlayer dielectric layers. An optional cladding layer 43 composed of a dielectric material, such as silicon nitride, may be deposited over the back-end-of-line stack 42.

A contact 44 may be formed that connects the tunable material layers 30 and 34 with wiring in the back-end-of-line stack 42, and a contact 46 may be formed that connects the tunable material layer 32 with wiring in the back-end-of-line stack 42. The contacts 44, 46 may be composed of a metal, such as tungsten, copper, or cobalt, and are located in respective etched contact openings. Through these connections, a switchable bias voltage may be applied from the wiring in the back-end-of-line stack 42 to the tunable material layers 30, 32, 34.

The grating coupler 12 may be switched between 'ON' and 'OFF' conditions or states by applying one or more different bias voltages to the tunable material layers 30, 32, 34 such that propagating optical signals encountering the grating coupler 12 can be either directed out of the plane of the grating coupler 12 with a high coupling efficiency or remain confined within the plane of the grating coupler 12 with a low coupling efficiency. For example, when a bias voltage (e.g., a negative bias voltage) is applied, the tunable material layers 30, 32, 34 may have a low refractive index providing high absorption and an 'OFF' state of the grating coupler 12 characterized by a low coupling efficiency. As another example, when a bias voltage is not applied, the tunable material layers 30, 32, 34 may have a high refractive index providing low absorption and an 'ON' state of the grating coupler 12 characterized by a high coupling efficiency.

The structure 10, in any of its embodiments described herein, may be integrated into a photonics chip 50 (FIG. 1) that includes electronic components 52 and additional optical components 54. For example, the electronic components 52 may include field-effect transistors that are fabricated by CMOS front-end-of-line (FEOL) processing.

Figure 6:
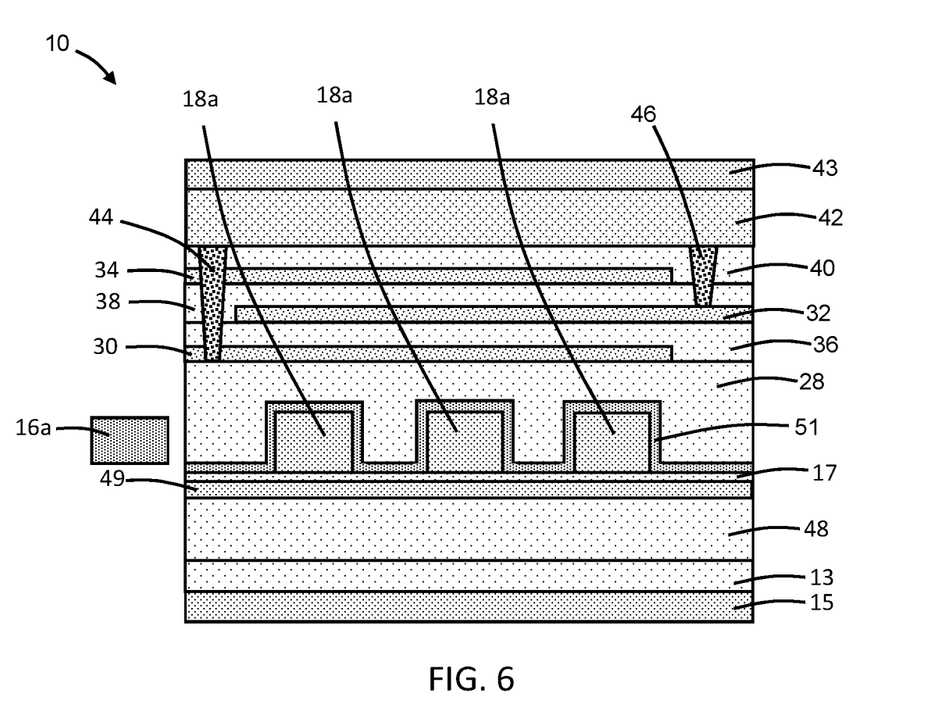
FIG. 6 is a cross-sectional view of a structure in accordance with alternative embodiments of the invention.

With reference to FIG. 6 in which like reference numerals refer to like features in FIG. 5 and in accordance with alternative embodiments of the invention, the structure 10 may be modified to form the grating features 18a of the grating coupler 12 from a different material. In an embodiment, the grating features 18a may be composed of a dielectric material, such as silicon nitride. Otherwise, the grating features 18a may have the same arrangement as the grating features 18a. A waveguide 16a, which provides optical signals to the grating coupler 12, is composed of the same material as the grating features 18a.

A conformal layer 51 composed of, for example, polysilicon may be deposited over the grating features 18a before forming the dielectric layer 28. The conformal layer 51 replaces the dielectric layers 24, 26. The grating coupler 12 may be formed over a dielectric layer 48 composed of, for example, silicon dioxide, instead of being formed over the semiconductor layer 14, and an additional dielectric layer 49 composed of, for example, silicon nitride may be formed between the grating coupler 12 and the dielectric layer 48.

The tunable material layers 30, 32, 34 may be used in conjunction with other types of optical components, such as photo-detectors, to provide optical signal switching. The ability to provide switching may be added to an optical component by mere addition of the tunable material layers 30, 32, 34 and the formation of contacts and wiring to enable the application of a bias voltage during operation.

Figure 7:
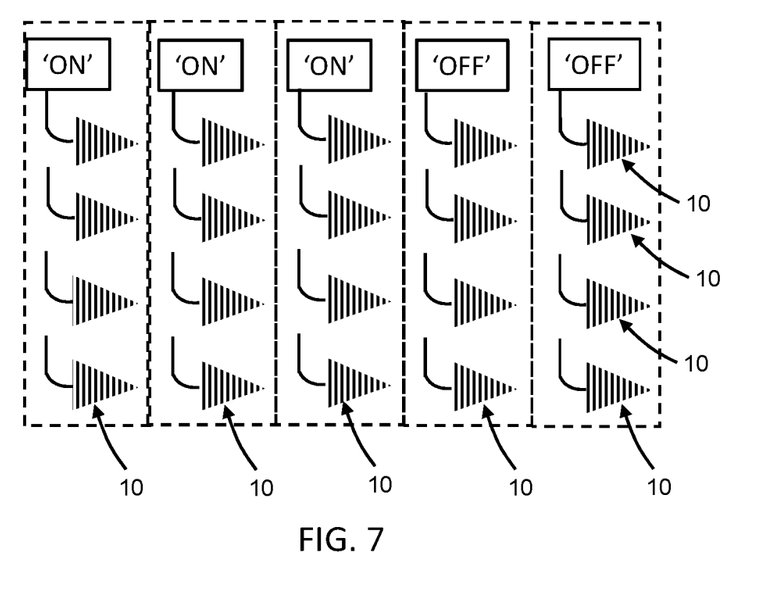
FIG. 7 is a diagrammatic view of an optical antenna array constructed using the structure of FIG. 5 or the structure of FIG. 6.

With reference to FIG. 7 and in accordance with embodiments of the invention, a switchable optical antenna may be constructed from multiple structures 10 each having the grating coupler 12 and a multilayer stack containing the dielectric layers 36, 38, 40 and tunable material layers 30, 32, 34 over the grating coupler 12. The structures 10 in the optical antenna may be organized in an on-chip phased array in which, for example, different columns of the grating couplers 12 in the array may be placed in different 'ON' and 'OFF' states. An application for the phased array of switchable optical antennas is light detection and ranging (LIDAR). The phased array has a significantly reduced footprint in comparison with conventional phased arrays that incorporate Mach-Zehnder interferometer (MZI) modulators to provide optical signal switching.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate+/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   an optical component;
   a first layer arranged over the optical component; and
   a second layer arranged over the optical component, the first layer arranged between the second layer and the optical component,
   wherein the first layer and the second layer each comprised of a tunable material having a refractive index that is a function of a bias voltage applied to the first layer and the second layer.

2. The structure of claim 1 wherein the tunable material is indium-tin oxide.

3. The structure of claim 1 wherein the tunable material is indium-tin oxide, vanadium oxide, germanium-antimony telluride, or a combination thereof.

4. The structure of claim 1 wherein the tunable material is an electro-optic polymer or a liquid crystal.

5. The structure of claim 1 further comprising:
   a dielectric layer arranged between the first layer and the second layer.

6. The structure of claim 5 further comprising:
   a first contact extending through the dielectric layer and connected with the first layer; and
   a second contact connected with the second layer.

7. The structure of claim 1 wherein the optical component is a grating coupler that includes a plurality of grating structures comprised of silicon nitride.

8. The structure of claim 1 wherein the optical component is a grating coupler that includes a plurality of grating structures comprised of polycrystalline silicon.

9. The structure of claim 1 further comprising:
   a back-end-of-line stack arranged over the first layer, the second layer, and the optical component.

10. The structure of claim 9 further comprising:
    a dielectric layer over the back-end-of-line stack, the dielectric layer comprised of silicon nitride.

11. The structure of claim 1 wherein the first layer has a first thickness, and the second layer has a second thickness that is greater than the first thickness.

12. The structure of claim 1 further comprising:
    a third layer over the optical component, the second layer arranged between the first layer and the third layer, and the third layer comprised of the tunable material.

13. The structure of claim 12 wherein the first layer, the second layer, and the third layer are arranged with a pitch that is periodic.

14. The structure of claim 12 wherein the first layer, the second layer, and the third layer are arranged with a pitch that is aperiodic.

15. The structure of claim 12 wherein the first layer has a first thickness, the second layer has a second thickness that is greater than the first thickness, and the third layer has a third thickness that is greater than the first thickness.

16. A method comprising:
    forming an optical component;
    forming a first layer over the optical component; and
    forming a second layer over the first layer,
    wherein the first layer and the second layer are each comprised of a tunable material having a refractive index that is a function of a bias voltage applied to the first layer and the second layer.

17. The method of claim 16 further comprising:
    forming a dielectric layer arranged between the first layer and the second layer;
    forming a first contact extending through the dielectric layer and connected with the first layer; and
    forming a second contact connected with the second layer.

18. The method of claim 17 further comprising:
    forming a back-end-of-line stack arranged over the first layer and the second layer,
    wherein the first contact and the second contact are each connected with wiring in the back-end-of-line stack.

19. The method of claim 16 wherein the optical component is a grating coupler.

20. The method of claim 16 further comprising:
    forming a third layer over the optical component,
    wherein the second layer is arranged between the first layer and the third layer, and the third layer is comprised of the tunable material.

* * * * *

UNITED STATES PATENT AND TRADEMARK OFFICE
CERTIFICATE OF CORRECTION

PATENT NO. : 10,585,245 B1
APPLICATION NO. : 16/199727
DATED : March 10, 2020
INVENTOR(S) : Yusheng Bian et al.

Page 1 of 1

It is certified that error appears in the above-identified patent and that said Letters Patent is hereby corrected as shown below:

In the Claims

At Column 7, Claim number 1, Line number 27, before "each" insert --are--

Signed and Sealed this
Twenty-sixth Day of May, 2020

Andrei Iancu
*Director of the United States Patent and Trademark Office*